(12) United States Patent
Aloy

(10) Patent No.: US 6,273,223 B1
(45) Date of Patent: Aug. 14, 2001

(54) DISC BRAKE

(76) Inventor: Jordi Nadal Aloy, Carretera Real 91, 08960 Sant Just Desvern Barcelona (ES)

( * ) Notice: Subject to any disclaimer, the term of this patent is extended or adjusted under 35 U.S.C. 154(b) by 0 days.

(21) Appl. No.: 09/558,729

(22) Filed: Apr. 26, 2000

(51) Int. Cl.$^7$ ............................................. F16D 57/00
(52) U.S. Cl. ........................... 188/264 AA; 188/24.11; 188/71.6
(58) Field of Search ................. 188/264 A, 264 AA, 188/264 R, 250 E, 250 B, 250 G, 24.11, 24.12, 24.13, 71.6, 218 XL, 58

(56) References Cited

U.S. PATENT DOCUMENTS

| | | | |
|---|---|---|---|
| 2,849,092 | * | 8/1958 | Foster .................................. 188/264 |
| 4,286,694 | * | 9/1981 | Wiseman, Jr. et al. ............. 188/71.5 |
| 4,485,898 | * | 12/1984 | Bracken et al. ................... 188/250 B |
| 5,544,726 | * | 8/1996 | Topouzian et al. .............. 188/264 A |
| 5,564,533 | * | 10/1996 | Parsons ............................ 188/250 E |
| 6,109,399 | * | 8/2000 | Crawford et al. ................ 188/250 B |
| 6,139,413 | * | 10/2000 | Sirany ................................... 451/415 |
| 6,145,636 | * | 11/2000 | Ikari et al. ...................... 188/218 XL |
| 6,186,293 | * | 2/2001 | Beer et al. ...................... 188/218 XL |

* cited by examiner

*Primary Examiner*—Christopher P. Schwartz
*Assistant Examiner*—Benjamin A. Pezzlo
(74) *Attorney, Agent, or Firm*—Jones, Day, Reavis & Pogue

(57) ABSTRACT

Improved disc brake, of the type comprising a disc in the shape of a flat circular crown having at a point of its periphery, two facing braking pads fitted to press the disc inserted between said pads. The brake is characterized in that at the disc inside perimeter there is a plurality of radially-arranged entrants, regularly distributed and preferably back-bent with respect to the rotation sense of the disc. Each of the brake pads facing the disc having on the face rubbing said disc, an arcuated recess in the sense associated with the previously cited entrant, from a mutual interference area to the pad external profile, an air communication is formed at the mutual interference area of the entrant and the recess which is cooling the brake unit.

1 Claim, 2 Drawing Sheets

A-A'

DISC BRAKE

DESCRIPTION

Object of the Invention

The present Utility Model application has as an object the registration of an improved disc brake incorporating remarkably innovations and advantages in front of the present disc brakes used in automotion or for similar purposes.

More particularly the invention has devised a disc brake made up with a disc and some brake pads having suitable entrants and hollows for causing an air stream through said disc and pads when in operation, all that turning up a better performance throughout.

BACKGROUND OF THE INVENTION

Presently several brakes used in cars, trucks and motorcycles are available in the market. One of the mostly used is the disc brake, because of its high performance and easy manufacturing.

Said brake is made up with a disc or a flattened circular crown integral with the wheel and some nippers located on said disc, the nippers being fitted for pressing the pads on the disc flat surface. Friction between a moving disc and the pads converts the disc kinematic energy into heat and the desired braking effect is thus achieved.

Said heat shall be released from the disc since otherwise it will be heated to a temperature causing serious problems. Problems like the loss of material hardness, large strains, brake life-shrinking and brake fluid steaming and others too are caused by an excessively heated disc brake.

Heretofore all these problems are only overcome by sizing correctly said discs, chastising weight factor, a very significant factor in the racing field. It can also be reduced by opening windows in the disc, although the disc thickness itself laying out obvious limitations.

The so-called self-ventilated discs are also available, said discs having inside between both side faces a turbine-shaped cavity, however its weight and cost often is highly enough.

DISCLOSURE OF THE INVENTION

The improved disc brake object of the present registration, is characterized in that it comprises a disc and two recessed brake pads such that a cavity is formed between both when braking and this cavity is pushing on an air stream like the one set up at the blades of a centrifugal turbine. When the disc is rotating, said air stream springs up from the disc inside perimeter and flows down through the entrant and is exhausted by the recess when said entrant flows between the brake pads. In this way the brake disc and pads are cooled by the forced air stream preventing in turn the pernicious effects of a disc to bear under a high temperature and further a remarkable size and weight waning is thus achieved.

Consequently the disc set up by a flat circular crown has a plurality of entrants at the inside. Said entrants can be radially-arranged, rearwardly or forwardly curved.

In turn each of the pads has a wide recess and an associated arrangement with the disc entrants. Just that the bottom of the entrants and the recess present in each pad, when matching at a mutual interference area, and the disc is rotating are both forming an air ducting.

Each of the multiple entrants present in the disc is really performing like the blade of a turbine by pushing on the air longwise and outwardly. When the air reaches the entrant bottom is deviated and flown down into the two recesses present at each brake pad, the air is exhausted down the rear portion of both pads. Cooling of the disc and pads unit during the air flowing is thus achieved.

To complete this description which will be further set out hereinafter and just to help to a better understanding of its characteristics, a set of drawings which figures illustratively and non-exhaustively show the most relevant details of the invention is attached to the present description.

DESCRIPTION OF A PREFERRED EMBODIMENT

Figure 1:
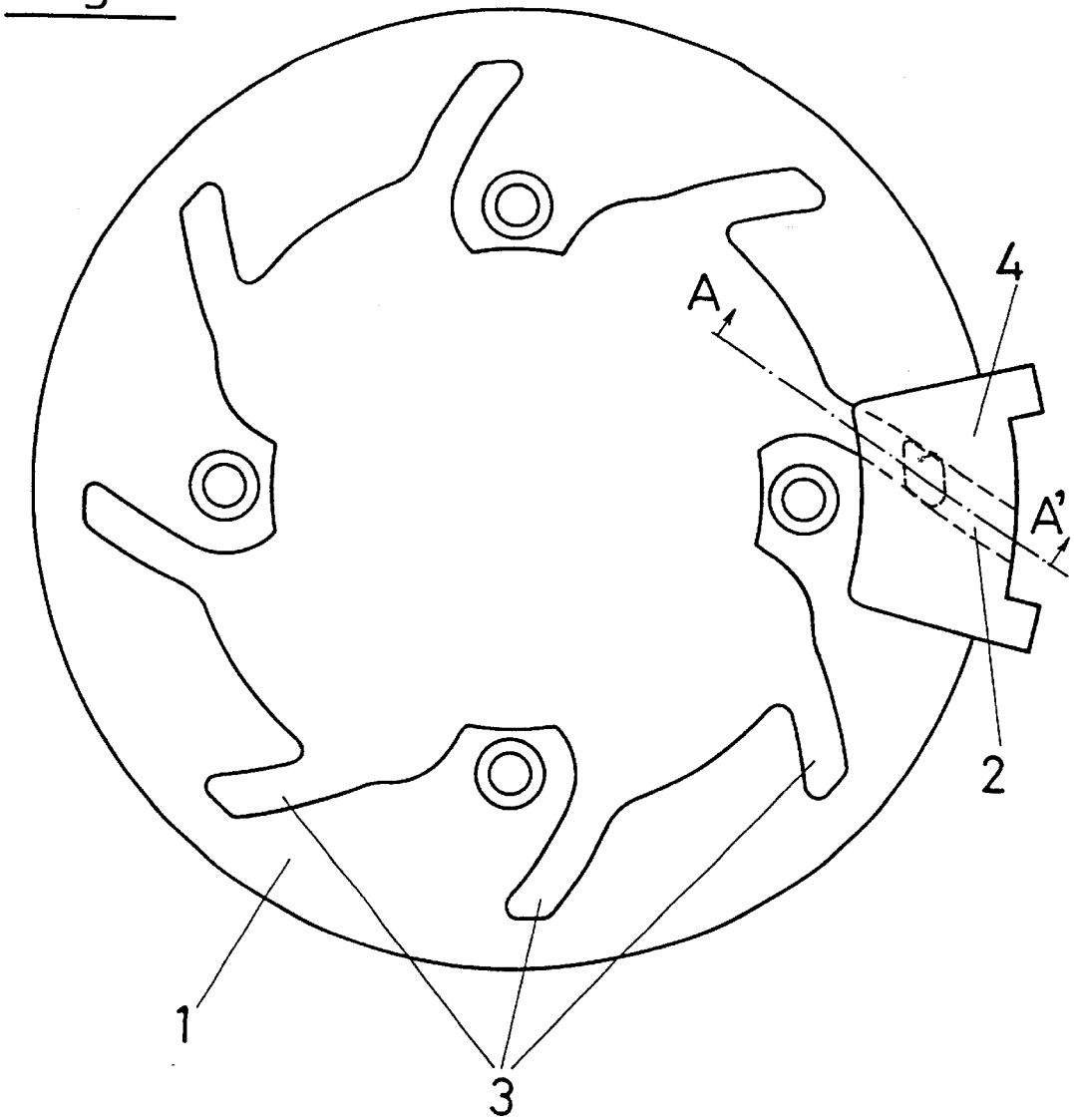
FIG. 1 shows a plan view of the brake unit.
Figure 2:
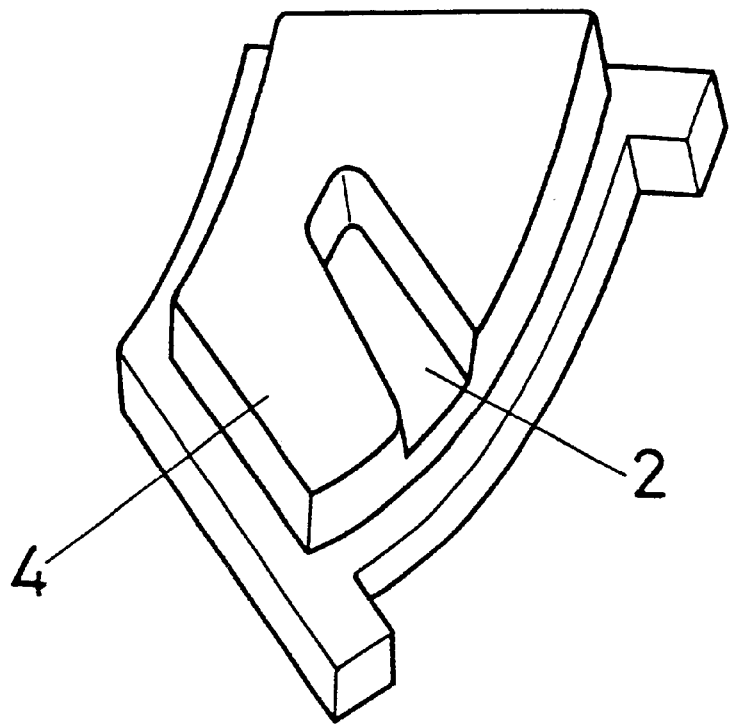
FIG. 2 shows a perspective view of the brake pad.
Figure 3:
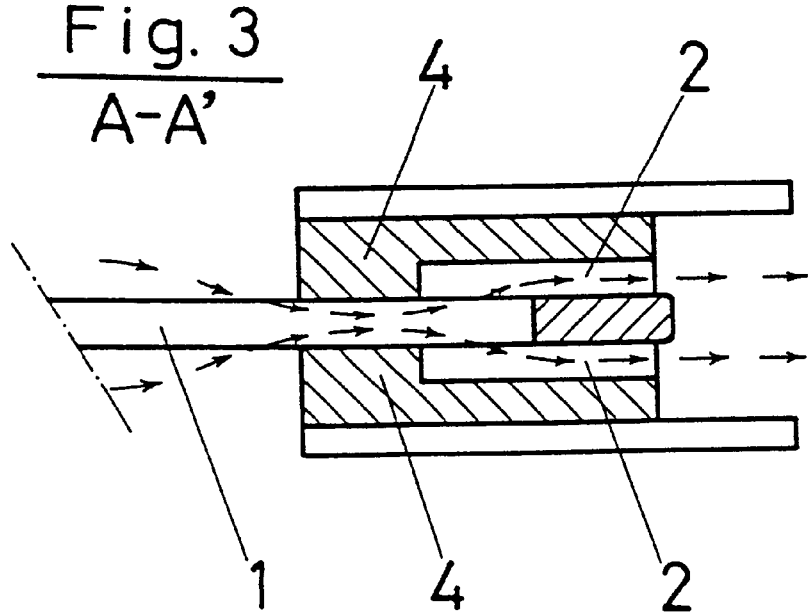
FIG. 3 shows a detail of the cross-section of the brake unit.

In view of the discussed figures and according with the adopted numbering, it can be seen in the figures a preferred embodiment, not by a long shot being exhaustive of the invention, which consists of a brake disc (1) set up by a flat circular crown having at the inside perimeter, a plurality of radial entrants (3) arranged preferably back-bent with respect to the sense of disc (1) rotation. Brake disc (1) is located between two mutually-faced brake pads (4). Each brake pad (4) having a low-height prismatic shape and a standard trapezium-shaped cross-section and on the face rubbing the disc, an arcuated recess (2) is present in the sense just associated with the entrant (3) from a mutual interference area to the pad (4) external profile. When the disc (1) rotates, an air passage at the entrant(3) and recess (2) mutual interference area is formed.

What is claimed is:

1. IMPROVED DISC BRAKE of the type comprising a disc (1) in the shape of a flat circular crown having a periphery circular sector between the two brake pads (4), said pads (4) facing each other and being fitted to be pressed against the disc (1), characterized in that the disc (1) has a plurality of entrants (3) at the inside profile in a manner of turbine blades; in that each of the pads (4) has an arcuated recess (2) at the rubbing face with the disc (1), the recess starting near the pad (4) external edge with respect to the disc (1) operating position and leads down to the inside portion also with respect to said operating position, said recess (2) being deemed as an extension of the entrants (3) of the disc (1) when located facing one of them; in that said pad (4) is fitted to match a mutual interference area with each entrant (3) of the disc (1) when the disc (1) rotates; in that the recess (2) on the pad (4) has a blind end matching with the entrant (3) blind end at an interference area, in such a way that an air communication is formed between said entrant (3) and the recess (2) in the passage of said entrant (3) between the pads (4); and in that the entrants (3) are radially-arranged and back-bent with respect to the rotation sense and being fitted to start an air centrifugal stream.

\* \* \* \* \*